United States Patent [19]

Ruehl et al.

[11] Patent Number: 4,588,152
[45] Date of Patent: May 13, 1986

[54] STUCCO WALL FASTENER

[75] Inventors: William E. Ruehl, Wheeling; Joseph P. DeMarco, Park Ridge, both of Ill.

[73] Assignee: Illinois Tool Works Inc., Chicago, Ill.

[21] Appl. No.: 590,306

[22] Filed: Mar. 16, 1984

[51] Int. Cl.⁴ .............................................. F16L 3/04
[52] U.S. Cl. .................................. 248/71; 248/74.5; 248/548; 411/475; 411/452; 411/41
[58] Field of Search ............ 248/548, 71, 74.5, 216.1, 248/67.5; 174/40 CC, 157, 159, 164, 165, 166 R; 24/457, 458; 411/908, 451-453, 439, 40-41, 446, 492, 469, 475

[56] References Cited

U.S. PATENT DOCUMENTS

| 1,390,275 | 9/1921 | Cornel | 411/451 |
| 2,724,303 | 11/1955 | Holcomb | 411/439 |
| 2,956,468 | 10/1960 | Macy . | |
| 2,995,328 | 8/1961 | Whitted | 248/71 |
| 4,094,490 | 6/1978 | Einhorn . | |

FOREIGN PATENT DOCUMENTS

| 535999 | 1/1957 | Canada | 248/71 |
| 919643 | 1/1973 | Canada | 248/74.5 |
| 1370201 | 7/1964 | France | 411/41 |
| 48759 | 4/1977 | Japan | 411/41 |
| 1220956 | 1/1971 | United Kingdom | 411/439 |
| 1226569 | 3/1971 | United Kingdom | 248/71 |
| 1512530 | 6/1978 | United Kingdom . | |

Primary Examiner—J. Franklin Foss
Assistant Examiner—Robert A. Olson
Attorney, Agent, or Firm—J. P. O'Brien; T. W. Buckman

[57] ABSTRACT

A wire clamping clip for mounting on a stucco wall is constructed as a block member having a workpiece engaging surface and an exposed top surface. A recess is formed in the workpiece engaging surface for receiving a wire. A throughbore is formed in the block adjacent to the recess and a plastic bushing having a cross sectional dimension of the same shape and slightly smaller than the cross sectional dimension of the throughbore is positioned in the throughbore. A hardened pin with a sharpened end is slidingly received in a tight frictional engagement through the center of the plastic bushing and has an enlarged head for abutting against the top end of said bushing and having a length longer than said bushing so that its sharpened end extends beyond the lower end of said bushing.

2 Claims, 7 Drawing Figures

STUCCO WALL FASTENER

BACKGROUND OF THE INVENTION

This invention relates to a wire clamping clip, in particular, relates to a wire clamping clip for mounting to stucco wall surfaces or the like.

Because of the brittleness of stucco material, the current state of the art for attaching a fastener requires a pre-drilled hole. This invention is intended to avoid the necessity of making a pre-drilled hole, by providing a wire clip having a fastening means that gradually increases the size of the fastening element to provide a holding relationship between the fastening member and the stucco wall surface.

Another object of this invention is to provide an anti-rotational means to prevent the plastic block that clips over the wire from rotating about the fastening member.

SUMMARY OF THE INVENTION

This invention is directed to an improved wire clamping clip for mounting a wire or cable onto stucco wall surfaces or the like. The wire clamping clip comprises three interfitting parts: a plastic block member having a wire receiving recess formed in its work engaging surface, a plastic bushing which is slidingly received in a throughbore formed in the block perpendicular to the wire receiving recess, and a hardened pin which fits through the center of the bushing in a tight frictional engaging relationship. The plastic bushing has a polygonal shape of a cross section dimension slightly smaller than the throughbore and has a length that extends beyond the throughbore into the stucco wall surface. The hardened pin has a length longer than the plastic bushing so that it extends beyond the end of the bushing when installed in a stucco wall surface.

DESCRIPTION OF DRAWING

For a better understanding of this invention, reference may be made to the accompanying drawing in which.

DESCRIPTION OF PREFERRED EMBODIMENT

Figure 1:
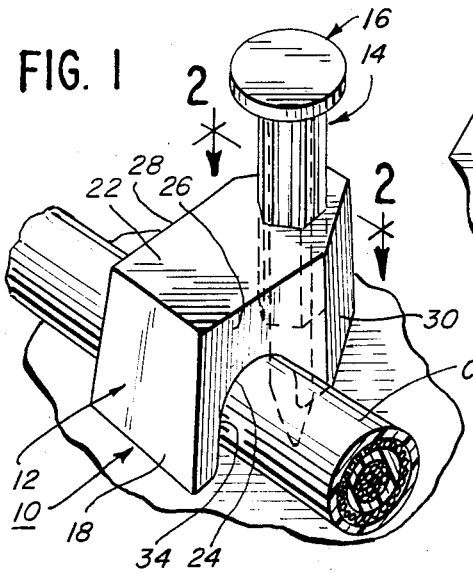
FIG. 1 is a partial perspective view of a stucco wall surface having a wire clamping clip embodying the principles of this invention mounting an electric cable to the stucco wall surface.

There is illustrated in the drawing a wire clamping clip, generally designated by the reference numeral 10 and embodying the principles of this invention. Wire clamping clip 10 is constructed of three cooperating parts: a base member 12, a bushing 14 and a hardened pin 16.

Base member 12 is constructed of a one-piece body 18 molded from a plastic material. Body 18 has a work engaging surface 20 and an exposed top surface 22, which is parallel to the work engaging surface 20. A wire receiving recess 24 is formed inwardly of the work engaging surface 20 and traverses the width of body 18 between its side surfaces 26 and 28.

Body 18 has a tapered nose portion 30 adjacent to the wire receiving recess 24. A throughbore 32 is formed in the tapered nose portion 30 extending between top surface 22 and work engaging surface 20.

Wire receiving recess 24 is formed by a bullet-shaped slot 34 and 35 formed respectively, in side walls 26 and 28. A cavity 37 is formed between the side walls 26 and 28 of body 18. Cavity 37 is formed below the top wall 36 for the purpose of saving material and for simplifying the molding of the body 18.

To accommodate slight variations in the diameter size of cable C, strain relief means is provided along, the recess 24 and body 18 by adding a rib 25 on one side of the side walls forming bullet-shaped slot 34 and 35 and by adding a rib 27 at the mid-section of recess 24 on the opposite side of the recess to provide a tortuous path for cable C through wire receiving recess 24.

Figure 2:
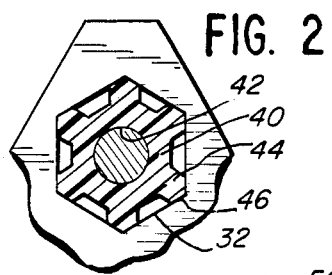
FIG. 2 is a cross sectional view take along the line 2—2 of FIG. 1 and looking in the direction of the arrows.

Bushing 14 has a cross sectional shape adapted to fit in throughbore 32. As depicted in FIG. 2 throughbore 32 has a hexagonal shape.

Bushing 14 has a central elongated body 40 with a generally hexagonal shape. Extending axially of hexagonal body 40 is a cylindrical throughbore 42. An axial flute 44 is integrally formed with body 40 at each of its hexagonal corners. Each axial flute 40 extend radially and have an arrow-shaped nose portion 46 which fits into one of the corners of hexagonal throughbore 32. The transverse dimension between oppositely extending axial flutes 40 is slightly smaller than the diagonally opposite corners of hexagonal throughbore 32 to provide a sliding fit between the bushing 14 and the throughbore 32.

Pin 16 has an elongate cylindrical shank portion 50 and a head portion 52. The cylindrical shank 50 is integrally formed with the head 52 at its center and has a diameter substantially equal or slightly larger than the outer diameter of cylindrical recess 42 to provide a firm force fit between bushing 14 and pin 16.

The length of cylindrical shank 50 is longer than that of the length of bushing 14 so that its long pointed end 54 acts as a punch point for driving through the stucco wall surface S.

The head portion 52 is shown as circular in shape. The head portion 52 could be of any regular configuration. Its important criteria is to have transverse dimensions greater than the largest cross dimension of throughbore 32 in order to hold the body member 30 firmly against the stucco wall surface S.

Figure 3:
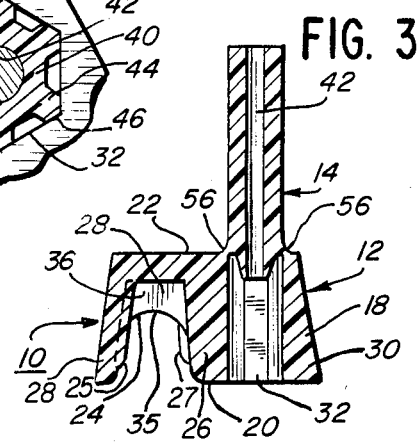
FIG. 3 is a cross sectional view of a portion of this invention showing the relationship between the plastic lock member and the plastic bushing as they have been molded together.
Figure 4:
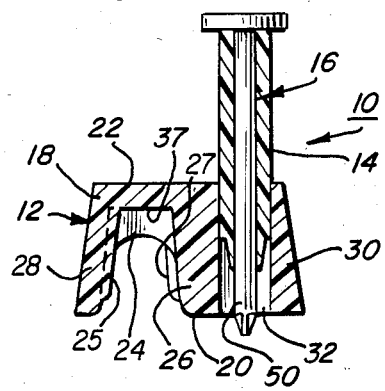
FIG. 4 is a cross sectional view of the wire clamping clip of this invention illustrating the plastic bushing and associated hardened pin being driven partially through the plastic block member.

As depicted in FIG. 3 the body member 12 and sleeve bushing 14 are preferably molded together from plastic material with each of the axial flutes 44 having a frangible connection with the top surface 22 of body member 12. This arrangement provides an easy assembly operation since it is only necessary to insert the hardened pin 16 to the sleeve member 14.

Figure 5:
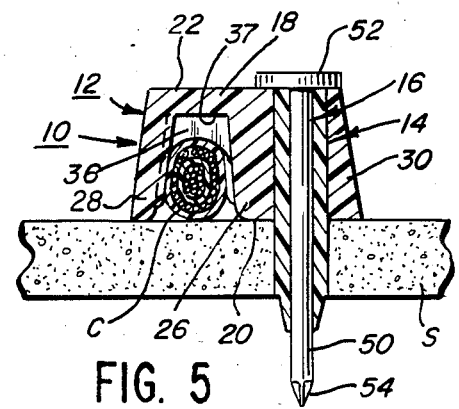
FIG. 5 is a cross sectional view of the preferred embodiment of this invention illustrating its installation of a cable wire onto a stucco wall surface.
Figure 6:
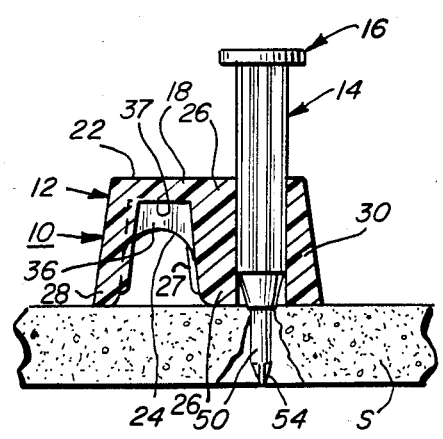
FIG. 6 is a sectional view of the plastic block member illustrating the condition of the stucco wall surface during the initial stages of installation.
Figure 7:
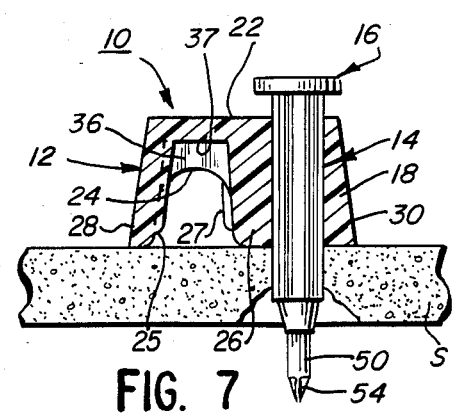
FIG. 7 is the same view as FIG. 6 depicting the relationship of parts after the fastener member has been driven through the stucco wall surface.

Referring to FIGS. 5, 6, and 7 there is illustrated the fastening of the clip 10 on the stucco surface S. In FIG. 6 there is shown the breakaway of the granular material forming stucco wall S as the drive pin 16 penetrates into the wall surface. As depicted in FIG. 7 further driving of the drive pin 16 brings the bushing 14 into opening of the stucco surface S. The contact between the stucco wall surface and the radially spaced axial flutes 44 contribute to minimize the amount of enlargement of the opening through the stucco wall surface. As the sleeve 14 is driven through the stucco wall surface S the loose material from the stucco wall surface tends to pack into the initial opening to increase the force fit in the stucco wall S.

An anti-rotation means for preventing the arcuate movement between sleeve 14 and body member 12 is provided by a polygonal aperture formed in the throughbore 32 and complementary shape of sleeve 14.

Accordingly, this invention provides a simple and efficient wire clamping clip for securement of a cable to a stucco wall surface. While specific embodiments of the various aspects of the invention have been disclosed, it will be understood that variations and modifications hereof may be effected without departing from the spirit and the scope of the novel concepts disclosed and claimed herein.

We claim:

1. A wire clamping clip for mounting on a stucco wall comprising a block member having a workpiece engaging surface and an exposed top surface, a recess formed in the workpiece engaging surface completely traversing said surface in a predetermined direction for receiving a wire, a throughbore formed in said block adjacent to said recess and in a normal relation therewith, a plastic bushing having a cross sectional dimension of the same shape and and slightly smaller than the cross sectional dimension of said throughbore and having a tapered nose portion at its lower end, said throughbore has a polygonal cross section and the exterior of said bushing has a conforming polygonal cross sectional shape to prevent rotational movement of said block member about said bushing, the length of said bushing being substantially longer than said throughbore, and a haredened pin with a sharpened end slidingly received in a tight frictional engagement through the center of said plastic bushing with an enlarged head for abutting against the top end of said bushing and having a length longer than said bushing so that its sharpened end extends beyond the lower end of said bushing.

2. A wire clamping clip for mounting on a stucco wall comprising a block member having a workpiece engaging surface and an exposed top surface, a recess formed in the workpiece engaging surface completely traversing said surface in a predetermined direction for receiving a wire, a throughbore formed in said block adjacent to said recess and ina normal relation therewith, a plastic bushing having a cross sectional dimension of the same shape and slightly smaller than the cross sectional dimension of said throughbore and having a tapered nose portion at its lower end, said throughbore has a polygonal cross section and the exterior of said bushing has a conforming polygonal cross sectional shape to prevent rotational movement of said block member about said bushing, the length of said bushing being substantially longer than said throughbore, and a hardened pin with a sharpened end slidingly received in a tight frictional engagement through the center of said plastic bushing with an enlarged head for abutting against the top end of said bushing and having a length longer than said bushing so that its sharpened end extends beyond the lower end of said bushing.

* * * * *